April 14, 1970     N. COHEN ET AL     3,505,805
CONTACT INDEX SYSTEM
Filed Jan. 4, 1968     2 Sheets-Sheet 1
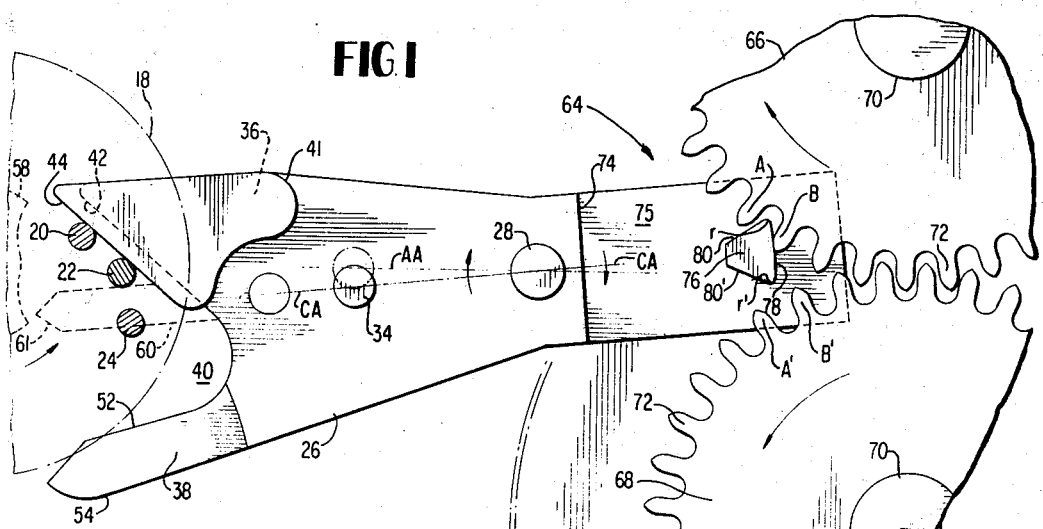
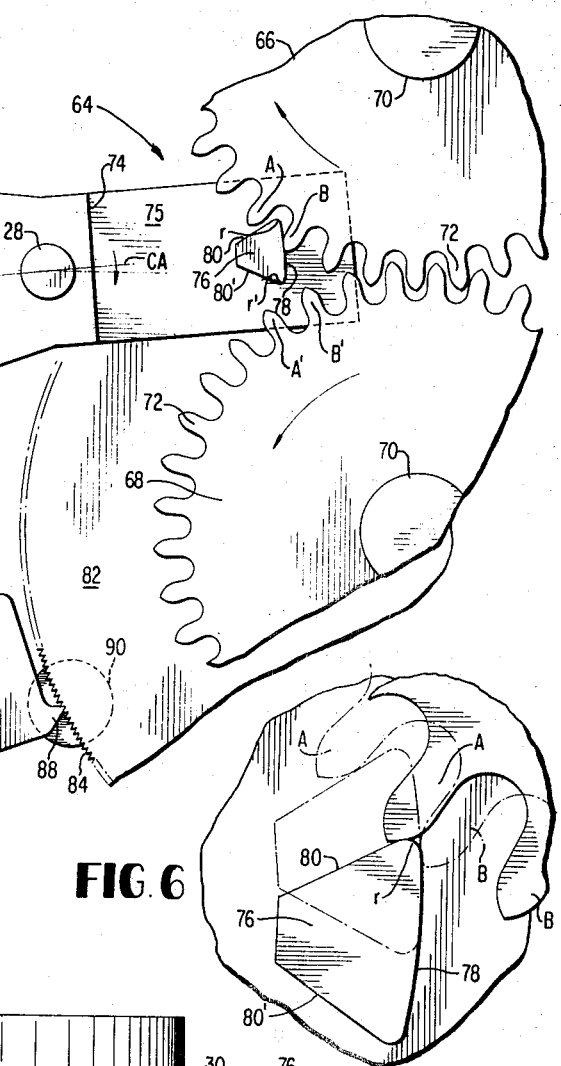
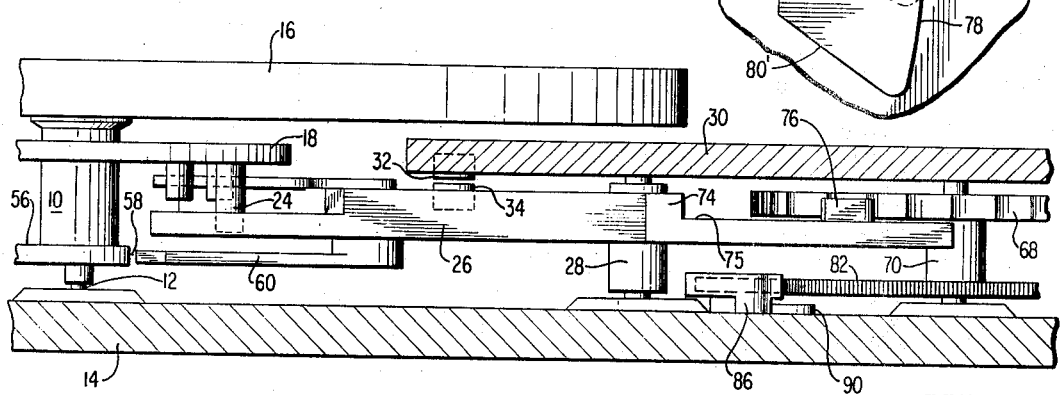
INVENTORS
NATHAN COHEN
JAMES H. ECKENRODE
DONALD W. BRASHEAR
BY *Le Blanc & Shur*
ATTORNEYS

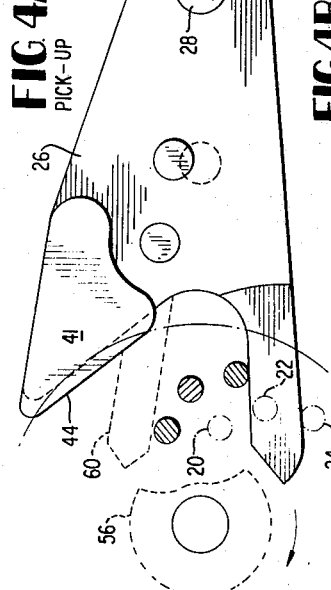
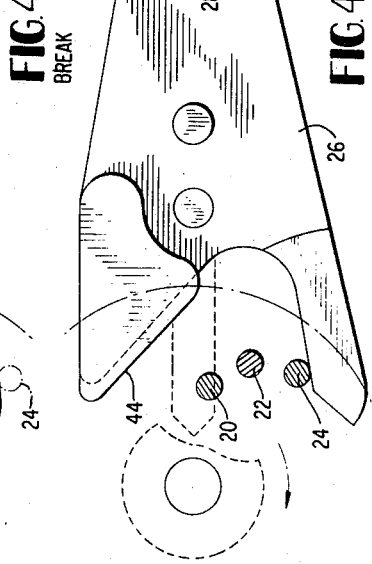
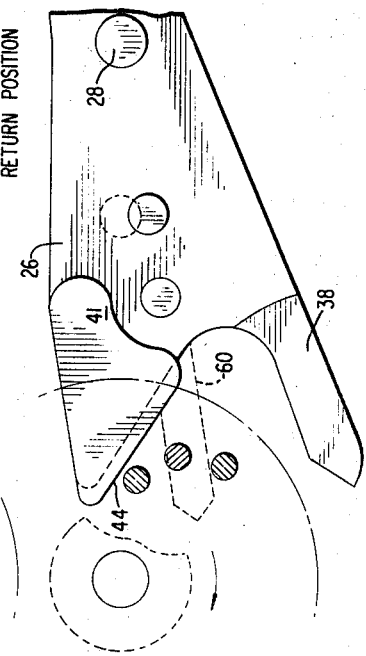
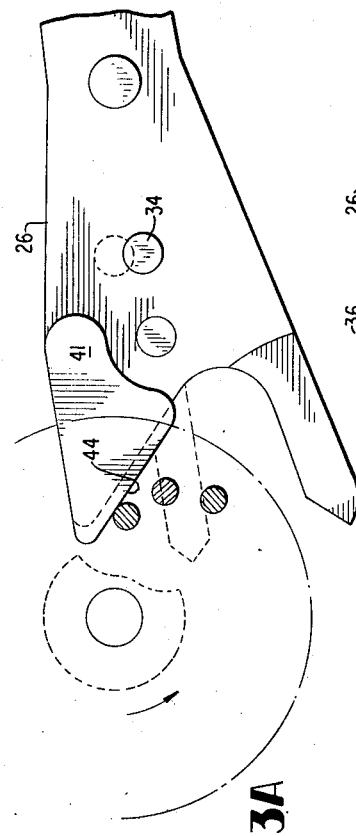
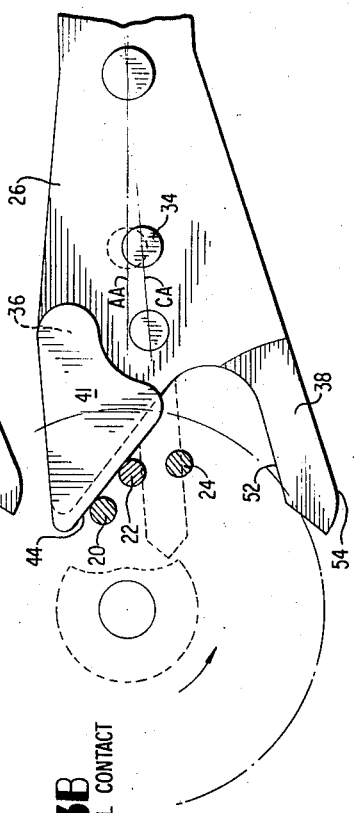
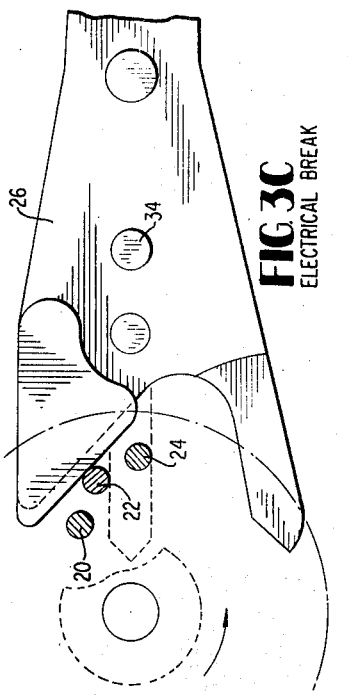
INVENTORS
NATHAN COHEN
JAMES H. ECKENRODE
DONALD W. BRASHEAR
BY Le Blanc & Shur.
ATTORNEYS

United States Patent Office 3,505,805
Patented Apr. 14, 1970

3,505,805
CONTACT INDEX SYSTEM
Nathan Cohen, Philadelphia, James H. Eckenrode, Millersville, and Donald W. Brashear, Lancaster, Pa., assignors to Hamilton Watch Company, Lancaster, Pa., a corporation of Pennsylvania
Filed Jan. 4, 1968, Ser. No. 695,731
Int. Cl. G04c 3/04
U.S. Cl. 58—28                                32 Claims

ABSTRACT OF THE DISCLOSURE

The contact index system comprises a pallet pivoted for rocking movement on a plate and an oscillating roller having three pins engaging within a forked end of the pallet, two pins of which pivot the pallet from lateral banked positions through a central position. A magnet on the plate aligned along the centerline joining the axes of the pallet and roller cooperates with a magnet mounted along the central axis of the pallet to drive the pallet from the central position to banked positions on opposite sides of the centerline. The first roller pin makes initial contact with one arm of the forked end of the pallet to pivot the pallet toward the central position. The second pin makes electrical contact with the arm of the pallet and pivots the pallet past the central position. The third pin clears the pallet and, being longer in length than the first two pins, strikes the opposite stepped down arm of the fork to prevent overbanking at the completion of the roller oscillation and to provide maximum range of oscillation. A pair of meshing index wheels are driven by a pin mounted on the opposite end of the pallet. The pin rocks between the gears and alternately strikes a tooth on each gear to advance the meshed gears until the next tooth on the same gear engages against the pin to prevent further movement of the pallet away from the central position. Magnetically actuated pawls engage a retaining wheel to preclude reverse motion of the index wheels as the pallet pin rocks between tooth-engaging positions.

BACKGROUND OF THE INVENTION

The present invention relates to a contact index system for a watch and more particularly to a contact index system of the pallet type for an electric watch.

In electric watches of the type having an oscillatory balance wheel mounting a coil which is impulsed by an electromotive force, the balance wheel serving to transmit the motive power, it is necessary to provide a contact and index system which will respectively energize the coil to oscillate the balance wheel and translate the oscillating movement of the balance wheel into rotary motion in a single direction to drive the gear train of the watch. Previously, contact and index systems have been separate and independent, one from the other, and it has been only recently that the contact and indexing functions have been combined in integrated units, an example of which is shown in U.S. Patent No. 3,158,988. Such contact-index system as therein illustrated advances the index wheel during the oscillatory excursion of the balance wheel in one direction only while the return oscillation imparts a slight backswing to the wheel which results in frictional and energy losses. It is desirable that frictional and energy losses through the contact index system be minimized to reduce the work requirements on the electromotive force (battery). Moreover, it has been found desirable that the index assembly and gear train driven thereby be driven on each stroke of the oscillating balance wheel.

In prior index mechanisms of the pallet type, considerable adjustment is necessary to maintain the pallet and index assembly in proper alignment for mutual interaction with minimal friction and energy losses. Drag of the pallet along the index assembly, mismatching of the pallet and index contact surfaces and snagging of the pallet on the index wheel teeth causes high friction and energy losses and may interrupt the timekeeping function. Additionally, such prior pallet type index mechanisms often limit the range of oscillatory movement of the balance wheel through overbanking contact between the balance staff roller pin and the pallet near the ends of the oscillatory excursions. This limits these watches for operation within an oscillatory range which does not correspond to the optimal timekeeping rate of approximately one to one-half turns plus a safety factor to preclude overbanking contact and the interference to proper timekeeping caused thereby.

SUMMARY OF THE PRESENT INVENTION

The present invention provides a pallet type contact index system for an electrically powered watch comprising, in general, a pallet mounted for rocking movement to opposite sides of a center position and having a forked end periodically receiving a roller pin assembly driven from the balance for pivoting the pallet from arrested positions on opposite sides of the center position to a slightly overcenter position. The roller pin assembly makes both physical and electrical contact with the pallot during the first half of the pallet stroke to complete an electrical circuit through the pallet and roller pin assembly between the energy cell and the coil to impulse the balance wheel and maintain the oscillatory motion thereof.

A bridge plate mounts a permanent magnet in a position spaced from the pivotal axis of the pallet and aligned with the center position. A second permanent magnet is carried on the pallet in position to register with the fixed magnet when the pallet swings into the center position. Like poles of the magnets oppose one another when the pallet swings through the center position to produce a repelling force driving the pallet from the slightly overcenter position toward arrested positions on either side of the center position to complete the pivotal motion in the corresponding direction. During the second and driving half of the pallet stroke in either direction, the opposite end of the pallet engages the indexing assembly to drive the gear train in one direction. After completing an oscillatory excursion in one direction, the roller pin assembly returns on the opposite oscillation to pivot the pallet in the opposite direction overcenter whereby the magnetic repulsion drives the pallet to again engage the indexing assembly to drive the gear train in the same direction. Electrical contact, however, is not made on the pallet return stroke.

In one aspect of the present invention, the banking pins normally provided in a pallet type index system are herein eliminated by the provision of a unique double wheel index assembly cooperating with a drive pin mounted on the pallet whereby the rocking movement of the pallet to either side of the center position is automatically arrested. Accordingly, a pair of index wheels are meshed one with the other and the pallet pin rocks between the opposed teeth to provide a unidirectional drive to the watch gear train from one of the wheels. The pallet pins is pivoted toward one side and engages a tooth on one of the wheels to drive the wheel in rotation until the next tooth thereof engages the front face of the pallet pin to cam the latter between the driven tooth and the next tooth, thereby precluding further pivotal movement of the pallet toward the one side. The pallet pin is then pivoted from the arrested position on the one side past center to engage a tooth on the other wheel and drive the meshed index wheels as before. The driven and next teeth on the other index wheel cam against the pin to arrest pivotal motion of the pallet on the other side of the center position.

The foregoing indexing arrangement precludes snagging of the pallet pin on the teeth of the index wheels and provides for a continuous indexing function notwithstanding misalignment and other interferences affecting the index wheels and pallet. The indexing wheels and pallet pin are normally aligned for equal advancement of each wheel for each stroke of the pallet providing a predetermined index advance for each two strokes of the pallet. Should there be slight misalignment or other interferences, for example, when one pallet stroke provides an advancement of one wheel proportional to the advancement of the other wheel on the opposite pallet stroke, the foregoing arrangement provides for a total advancement of the index wheels for each two strokes of the pallet equal to the predetermined advance notwithstanding unequal index advances on consecutive strokes.

Another aspect of the present invention provides for a maximum range of oscillatory movement of the balance staff roller and balance wheel before overbanking occurs. Optimum timekeeping rates occur when the oscillatory stroke of the balance wheel has a range of approximately one and one-half turns or about 540°. A safety factor of an additional ⅛ turn or about 35° of oscillation is herein provided as the range of oscillation in use may exceed the optimum range.

To accomplish this, three roller pins are provided; the first pin engages the contact fork of the pallet arm to move the pallet from its banked or arrested position toward the center position, the second pin then engages the contact fork to make electrical contact therewith and pivot the pallet slightly overcenter, and the third pin clears the contact fork as the pallet is impulsed toward the opposite side of the center position by the opposed magnets. The noncontact arm of the fork is stepped away from the roller to permit the first two pins to pass between the noncontact arm of the fork and the roller at the end of the balance staff oscillation, while the third and longer pin may engage the noncontact arm of the fork to prevent overbanking. This increases the range of oscillation by an angular distance equal to the angle between the first and third pins providing a total oscillatory range of about one and five-eighths turn.

Still another aspect of the present invention wherein energy losses due to friction are minimized lies in the provision of a magnetically actuated pawl for retaining the index wheels in their advanced positions without reverse rotation thereof as the pallet swings between wheel engaging positions. The pawl is magnetically held in engagement against the retaining wheel of the index wheel assembly and the friction losses occasioned by physical contact biasing devices heretofore employed are entirely eliminated. A form of retaining pawl herein provided comprises per se a permanent magnet having end portions on opposite sides of the pawl axis producing an attracting force between the retaining wheel and the end portions. One end engages the wheel while the other is spaced therefrom whereby the force of attraction and hence net friction loss decreases as the pawl pivots to click past the teeth on the retaining wheel.

Accordingly, it is a primary object of the present invention to provide an improved contact index system for an electrically powered watch.

It is another object of the present invention to provide a contact index system of the pallet type for an electrically powered watch which is rugged, dependable, and requires virtually no adjustment.

It is yet another object of the present invention to provide an index system for a watch having a pair of index wheels wherein the pivotal action of the pallet toward either side of the central axis is automatically arrested by a cooperation between the pallet pin and index wheels.

It is still another object of the present invention to provide an index system of the pallet type for a watch wherein pallet banking pins are not required.

It is a further object of the present invention to provide an index system of the double wheel type for a watch wherein the index wheel assembly may advance in a timed relation over a wide range of misalignment of the wheels and pallet pin, thereby affording an index system which is rugged, durable and accurate during normal use of the watch.

It is yet a further object of the present invention to provide an index system for a watch having a pallet which is magnetically biased into driving engagement with the index assembly.

It is still a further object of the present invention to provide a contact index system of the pallet type for an electrically powered watch wherein the roller pin and balance wheel obtain an optimum range of oscillatory motion before overbanking occurs.

It is still a further object of the present invention to provide an index system which is retained in an advanced position under the magnetic bias.

These and further objects and advantages of the present invention will become more apparent upon inspection of the following specification, claims, and appended drawings.

DESCRIPTION OF THE DRAWING FIGURES

FIGURE 1 is a fragmentary plan view of the contact index system of the present invention with portions illustrated in phantom for ease of illustration;

FIGURE 2 is a fragmentary elevational view thereof on a reduced scale;

FIGURES 3A–3C are fragmentary plan views of the pallet fork and roller assembly illustrating the position thereof for pallet pickup, electrical contact, and electrical break for one stroke of the pallet;

FIGURES 4A–4C are fragmentary plan views of the pallet fork and roller pin assembly illustrating the position thereof for pallet pickup, break, and pallet return on the opposite stroke of the pallet;

FIGURE 5 is a plan view of a second form of magnetic pawl and shown coacting with a retaining wheel on the index assembly; and FIGURE 6 is a fragmentary enlarged plan view of the engagement between the pallet pin and an index wheel at initial and arrested positions.

DESCRIPTION OF THE PREFERRED EMBODIMENT

Referring to FIGURES 1 and 2, a balance staff 10 is mounted by means of suitable pivots 12 at opposite ends thereof in a bridge and pillar plate, only one pivot 12 and pillar plate 14 being shown. Balance staff 10 carries a balance wheel 16 on which may be mounted a coil, not shown, of the general type illustrated in U.S. Patent No. 2,806,908, and which is successively energized to oscillate the balance wheel and balance staff 10. Balance staff 10 carries a roller 18 having three pins 20, 22, and 24 extending from the lower face thereof as seen in FIGURE 2. The first and second pins 20 and 22 respectively are equal in length, first pin 20 being spaced circumferentially ahead of second pin 22 on counterclockwise rotation of roller pin 18 through an angle $e$ as seen in FIGURE 3A and on a shorter radius than second pin 22. Third pin 24 is longer in length than pins 20 and 22 and is spaced circumferentially behind pin 22 through an angle $f$ and on a longer radius than pins 20 or 22. Pins 20 and 24 are preferably ruby pins while pin 22 is preferably a gold contact pin forming an electrical path with the roller assembly to a coil, not shown, carried by balance wheel 16.

A pallet 26 is mounted for rocking or oscillatory movement on a shaft 28 pivoted as opposite ends of a bridge plate 30 and pillar plate 14. A permanent magnet 32 is inset on the lower surface of bridge plate 30 and spaced from shaft 28 along a straight line AA intersecting the pivotal axes 10 and 28. A permanent magnet 34 is inset on the central longitudinal axis or centerline CA of pallet 26 and is spaced from axis 28 an equal distance to underlie and substantially register with magnet 32 when pallet 26 lies in a center position with the axes CA and AA in longitudinal alignment. Magnets 32 and 34 have adjacent poles of like polarity in spaced registry one with the other across the gap therebetween producing a magnetic bias or force repelling one another. In this manner, once the centerline CA of pallet 26 is slightly angularly offset from or misaligned with axis AA with magnet 34 offset to one side of magnet 32, the magnetic repelling bias of magnets 32 and 34 drives pallet 26 about axis 28 to the corresponding side.

One end of pallet 26 is bifurcated to form a fork having arms 36 and 38 enclosing a recess 40 opening through the end of the pallet fork. A contact plate 41, preferably gold, overlies the upper surface of arm 36 as seen in FIGURE 2 and extends from the inner edge 42 of arm 38 into recess 40 to provide a contact edge paralleling inner edge 42. Shortened pins 20 and 22 project from roller 18 into the oscillatory path of arm 36 to engage edge 44 of plate 42 to rock pallet 26. Pallet 26 is preferably formed of nickel and silver and the pivotal mounting for pallet shaft 28 may comprise a silver jewel bearing having a gold bearing shoulder thereagainst, not shown, providing an electrically conductive path from plate 41, through pallet 26, to an energy cell or battery, not shown. Accordingly, contact between pin 22 to edge 44 of plate 41 completes an electrical circuit to energize the coil and impulse balance wheel 16 to maintain the oscillatory motion thereof. Opposite arm 38 is stepped downwardly as at 50 such that pins 20 and 22 pass over the upper face of arm 38 as seen in FIGURE 2 and clear arm 38 at the end of the contact oscillatory excursion described hereinafter. Pin 24 has a length such that its free end may engage against the opposite lateral faces 52 and 54 of arm 38 during opposite oscillatory excursions of roller 18.

A safety roller 56 is mounted on the lower end of balance staff 10 and is provided with a crescent-shaped face 58. A guard pin 60 is mounted on the underside of pallet 26 as seen in FIGURE 2 and extends along the centerline thereof to terminate in a tip 61 within the diametrical confines of roller 56 but spaced from the crescent-shaped face 58. Guard pin 60 and safety roller 56 cooperate to prevent movement of pallet 26 toward the center position from the arrested position as hereinafter described while roller 18 completes its oscillatory excursions, all of which is conventional and therefore requires no further description.

An index assembly, designated 64, is mounted adjacent the opposite end of pallet 26 and comprises a pair of index wheels 66 and 68 suitably mounted on shafts 70 pivoted at opposite ends to bridge plate 30 and pillar plate 14. Index wheels 66 and 68 have peripheral teeth 72 which mesh one with the other as seen in FIGURE 1. The forward end of pallet 26 beyond pivot 28 is stepped down as at 74 and a pin 76 is mounted on stepped face 75 to project between wheels 66 and 68 at a point spaced rearwardly from the meshing teeth on the wheels. The front face 78 of pin 76 is curved and lies on an arc of a circle having pallet axis 28 as the center. The lateral faces 80 and 80' of pin 76 form corner radii $r$ and $r'$ with front face 78 and extend sharply readwardly from front face 78 to converge, if extended, on the central radius of face 78. A retaining wheel 82 is mounted on one of the index wheel shafts 70 and has a plurality of fine teeth 84 spaced about its periphery. A pawl 85 is pivotally mounted on pillar plate 14 on a shaft 86 and has a pointed edge 88 engaging teeth 84. Pawl 85 is formed of magnetic material and a permanent magnet 90 is mounted on pillar plate 14 at a position inwardly of pawl 84 so that the greater portion of the magnet lies beneath wheel 82 as seen in FIGURE 1. In this manner, the magnetic bias of magnet 90 retains edge 88 of pawl 85 in engagement against teeth 84 to preclude reverse motion of the index wheels after advancement thereof.

It is a significant feature hereof that the rocking motion of pallet 26 alternately advances wheels 66 and 68 and is automatically arrested at the end of each rocking stroke. To accomplish this, the index wheel teeth 72 are spaced and pin 76 is configured such that, as pallet 26 is rotatably driven by cooperating magnets 32 and 34 from the center position toward one side, the radius $r$ adjacent face 80 of pin 76 engages against the side of a tooth A on one of the index wheels 66 or 68 as seen in full line in FIGURE 6 to rotate wheel 66 or 68 in one direction. Upon initial engagement of pin 76 and driven tooth A, the front face 78 of pin 76 is spaced from the next tooth B so that pallet 26 is free to pivot further toward the one side to advance the one wheel. Upon advance of the wheel, the next tooth B abuts face 78 camming pin 76 between the driven and the next tooth A and B respectively, thereby preventing further pivotal movement of pallet 26. Pivotal movement of pallet 26 toward either side of the central position is thus arrested after a predetermined rotation thereof.

Operation of the contact index system hereof will now be describde. Assuming that pallet 26 is in the arrested position illustrated in FIGURE 3A and that roller 18 is on a counterclockwise oscillatory excursion about pivot 10, first pin 20 initially engages edge 44 of plate 41 to rotate pallet 26 from its arrested position toward the center position. Clockwise rotation of pallet 26 withdraws pin 76 from the cammed position between the driven tooth A and the next adjacent tooth B as described more fully hereinafter. As roller 18 continues its counterclockwise oscillatory excursion and as pallet 26 pivots toward the center position against the repelling bias of magnetic pins 32 and 34, the second pin 22 engages edge 44 making electrical contact therewith and completes a circuit to the coil from the battery, not shown, through pin 22 and pallet 26. Balance wheel 16 is thus impulsed to maintain the oscillatory motion thereof and of roller 18. As roller 18 continues its oscillatory excursion, pin 20, being on a shorter radius than pin 22, disengages from edge 44 and contact pin 22 continues to drive pallet 26 clockwise to an overcenter position locating the centerline CA thereof slightly beyond the central axis AA and magnet 34 slightly to one side of magnet 32. At this point, the magnitude of the repelling bias between magnetic pins 32 and 34 is substantially at a maximum value and such bias drives pallet 26 clockwise from the slightly overcenter position toward the one side thereof. The magnetic repelling action pivots pallet 26 away from contact pin 22 to break electrical contact with plate 41, thus deenergizing the coil on balance wheel 16. Roller 18 continues on its counterclockwise oscillatory excursion and pin 24 clears edge 44 without making contact therewith as pallet 26 is pivoted away from pin 24 by the repelling magnetic bias at a rate such that edge 44 moves away from pin 24 faster than pin 24 can rotate toward edge 44.

Turning now to FIGURES 1 and 6, initial clockwise pivoting of pallet 26 causes pin 76 to disengage from driven tooth A. Since front face 78 of pin 76 is on the arc of the circle having axis 28 as its center, pin 76 is free to rotate from the banked or arrested position. As pallet 26 continues to rotate and passes beyond central axis AA, the radius $r'$ of opposite face 80' of pin 76 is driven against tooth A' of wheel 68 to rotate the latter in the opposite direction from wheel 66. After a predetermined rotation, the next tooth B' engages against the front face 78 to cam pin 76 between the driven and next tooth A' and B' respectively and thereby arrest the clockwise rotation of pallet 26 as seen in FIGURE 1. It will be noted that independent banking pins are herein eliminated by the foregoing arrangement and that the banking action is provided by the cooperation of the uniquely arranged pallet pin and teeth. It will also be noted that the watch drive train may be geared to one or the other of the wheels 66 and 68 and is advanced on each stroke of pallet 26 as wheels 66 and 68 are in meshing engagement.

Turning now to FIGURES 4A–4C, the counterclockwise oscillatory excursion of roller 18 has been completed and roller 18 is illustrated in FIGURE 4A part way through its clockwise oscillatory excursion, pallet 26 being maintained in the illustrated and arrested position by the camming action of pin 76 between teeth A' and B' seen in FIGURE 1. The arrested position of pallet 26 is such that pin 24 on the larger pin radius of roller 18 clears edge 44 of plate 41 on the return stroke. Continued oscillation of roller 18 drives pin 24 into engagement against the inner face of stepped down arm 38 to pivot pallet 26 from the clockwise arrested position toward the center position. As pallet 26 pivots, pin 76 rotates in a counterclockwise direction as seen in FIGURE 1 and is thereby withdrawn from engagement against tooth A'. Continued oscillation of roller 18 pivots pallet 26 slightly past the center position whereupon repelling magnets 32 and 34 drive pallet 26 away from the center position toward an arrested position on the opposite side thereof as before. Thus, arm 38 pivots away from pin 24 at a rate faster than pin 24 pivots toward arm 38 and it will be noted that pins 20 and 22 have pivoted to the opposite side of the central axis AA to the extent that pallet 26 is arrested from further pivotal movement before edge 44 thereof can abut pin 20. Roller 18 continues its clockwise oscillating excursion without further physical contact with pallet 26 as seen in FIGURE 4C. When pallet 26 pivots beyond the center position, the radius r of pin 76 engages tooth A of wheen 66 to rotate the latter until the next tooth B engages against front face 78 and arrests the counterclockwise rotation of pallet 26.

It will be noted that when pallet 26 is in the center position, tip 61 of guard pin 60 extends within the periphery of safety roller 56 and is spaced from the cresent-shaped face 58 thereof. As pallet 26 pivots toward either arrested position and tip 61 pivots outwardly of the diametrical confines of roller 56, roller 56 continues its oscillatory excursion and locates the full diameter face thereof adjacent tip 61 of guard pin 60 such that shocks or other interferences tending to displace pallet 26 inwardly from either arrested position toward the center axis causes engagement between guard pin 60 and the full diametrical face of roller 56, thereby maintaining pallet 26 in the associated arrested position.

As seen in FIGURE 1, the rotary advance of each index wheels 66 and 68 is transmitted to retaining wheel 82, the teeth 82 thereof clicking past edge 88 of pawl 85. The magnetic attraction between magnet 90 and pawl 85 retains edge 88 engaged against teeth 84 to prevent the index wheels from backing up due to friction between the front face 78 of pin 76 and next teeth B and B'. Pawl 85 also precludes reverse torque on the watch gear train wheels while pallet 26 is pivoting between driving engagement against teeth A and A'.

Another form of the retaining pawl is illustrated in FIGURE 5 and includes an elongated member 92 pivotally mounted to pillar plate 14 as at 94 and having inwardly directed end edges 96 and 98. Pawl 92 comprises a permanent magnet having opposite poles at edges 96 and 98 providing attraction between edges 96 and 98 and wheel 82. Edge 96 is maintained in following engagement along teeth 84 by the magnetic attraction between edge 96 and wheel 82, the magnitude of the attraction between edge 98 and wheel 82 being less than the magnitude of attraction between edge 96 and wheel 82 as edge 98 is maintained in spaced relation from teeth 84 as noted below. As wheel 82 pivots counterclockwise and pawl 92 pivots clockwise as seen in FIGURE 5, edge 96 rides over the tip of a tooth 84 and edge 98 pivots toward teeth 84 thereby increasing the magnitude of the magnetic attraction therebetween but not to the extent that it overcomes the greater magnetic attraction between the engaged edge 96 and teeth 84. The maximum clockwise rotation of pawl 92 with edge 96 being maintained in following engagement against teeth 84 leaves a clearance between edge 98 and teeth 84 such that edge 98 does not physically contact teeth 84. In this manner, as wheel 82 clicks past pawl 92, the bearing pressure of edge 96 against teeth 84 progressively diminishes from a maximum when edge 96 fully engages between adjacent teeth 84 to a minimum when edge 96 bears against the tips of the teeth. The friction loss in retaining wheels 66 and 68 in the advanced position is thus considerably reduced.

In the preferred and illustrated embodiment of the present invention, the pallet 26 pivots through a total range of 19° providing a 9°30′ swing from the center axis AA to the arrested positions on opposite sides thereof. The angular separation of pins 20, 22 and 24 is preferably about 18° and the radial distances of pins 20, 22 and 24 from the axis of roller 18 is about .0224, .0302 and .0344 inch, respectively. Pins 20, 22 and 24 are .006 inch in diameter and pin 22 forms an angle of 22°11′ with axis AA when pin A initially contacts edge 44 with pallet 26 in the arrested position shown in FIGURE 3A (edge 44 forming a 45° angle with centerline CA). Electrical contact is made between plate 41 and pin 22 when axis CA of pallet 26 is 5°9′ away from axis AA and pin 22 is 2° from axis AA pivoting toward the center position. Electrical break occurs with pallet 26 in the center position and pin 22 forming an angle of 16° past axis AA. Pallet axis 28 is located .1181 inch from the roller axis 10 and .0791 inch from a straight line through the centers of index wheels 66 and 68, pin face 78 having a radius of .050 inch.

It is a significant feature hereof that a maximum range of oscillatory motion of roller 18 and balance wheel 16 can be obtained before overbanking occurs. The cooperation between the stepped down arm 38 of pallet 26 and the pins 22 and 24 permits a total additional oscillatory motion of the angular distance between pins 20 and 24, i.e., about 35°. To accomplish this, pins 20 and 22 are shortened in length to pass above stepped down arm 38 as seen in FIGURE 2 at the completion of the counterclockwise oscillatory excursion of roller 18. (Note the dashed outline of the pins in FIGURE 4A). This specific geometry permits pin 24 to engage against the outer face 54 of arm 38 to limit the counterclockwise oscillatory excursion of roller 18 and thereby prevent overbanking. If the pins 20 and 22 were of a length equal to the length of pin 24, pin 20 would first strike arm 38 and limit the oscillatory motion of roller 18. As noted hereinbefore, optimal timekeeping requires a range of oscillatory motion approximately equal to 540° plus a safety factor. The foregoing arrangement provides a safety factor of about 35° thus virtually eliminating energy losses incurred by overbanking.

It is also a feature hereof that the index assembly provides continuous timekeeping motion notwithstanding a misalignment or other interferences affecting the wheels and pallet. For example, if pallet pin 76 is misaligned with respect to the wheels 66 and 68 and is capable of advancing wheel 66 only one-half of the normal one-half tooth advancement for each stroke of pallet 26 (normal one stroke advancement with the wheels having thirty-six teeth each being 5°), the opposite stroke of pallet 26 would make up the difference plus its full one-half tooth advancement of wheel 68. Specifically, the first stroke would advance wheel 66 2½° before arrestment thereof while the opposite stroke would advance wheel 68 7½° before arrest. Accordingly, the timekeeping function is continuous notwithstanding slight misalignments or interferences.

It is thus apparent that the objects of the invention have been fully accomplished in that there is provided a contact index system of the pallet type for an electrically powered watch which is rugged, dependable and requires virtually no adjustment. Moreover, banking pins, heretofore provided in index systems of the pallet type in prior watches, have been entirely eliminated by the automatic arrestment of the pallet through the unique cooperation of the pallet pin and index wheels. The oscillatory movement of the balance wheel is provided with a large safety factor to prevent overbanking under normal circumstances with the balance wheel being free to oscillate with the optimal timekeeping range of about a turn and one-half with an additional safety factor of about 35°. Additionally, a unique pallet pivoting action has been provided through the overcenter magnetic repulsion of the pallet to either side of the center position.

What is claimed and desired to be secured by United States Letters Patent is:

1. A contact index assembly for driving a gear train of an electrically powered watch comprising a pallet mounted for rocking movement betwen laterally spaced angular positions and having a forked end portion including an electrical contact, a balance staff mounted for oscillating movement, means on said balance staff for engaging said end portion of said pallet to impart rocking movement to said pallet as said balance staff oscillates, an index assembly adapted to drive a watch gear train, the other end portion of said pallet adapted to drive said index assembly during rocking movement of said pallet to advance the gear train in one direction, said engaging means including a roller having first and second angularly spaced pins projecting therefrom, said first pin engaging within the forked end portion of said pallet to initiate rocking movement of said pallet, said second pin being formed of electrically conductive material and engaging said electric contact on said pallet end portion.

2. A contact index assembly according to claim 1 wherein said pins project from a face of said roller, said first pin lying on a shorter radius than said second pin and being angularly spaced forwardly of said second pin on the electrical contact stroke of said roller.

3. A contact index assembly according to claim 1 wherein said first and second pins successively engage said pallet end portion, said first pin engaging said end portion of said pallet to pivot said pallet through a predetermined angle before said second pin makes electrical contact with said end portion of said pallet.

4. A contact index assembly according to claim 3 wherein said electrical contact on said end portion comprises a plate overlying one of the forked ends of said pallet and having an edge extending inwardly from the inner edge of said one forked end, said first and second pins engaging against said edge to pivot said pallet in said one direction.

5. A contact index assembly according to claim 1 wherein said pallet swings through an angular position intermediate said lateral angular positions, magnetic means mounted to bias said pallet away from said intermediate angular position toward said lateral angular positions, said engaging means pivoting said pallet from one of said lateral positions through said intermediate position, said magnetic means driving said pallet toward the other lateral position and away from said engaging means, said second pin engaging said electrical contact during pivoting of said pallet from said one lateral position toward the intermediate position.

6. A contact index assembly according to claim 5 wherein said pins project from a face of said roller, said first pin lying on a shorter radius than said second pin and being angularly spaced forwardly of said second pin on the electrical contact stroke of said roller, said first and second pins successively engaging said pallet end portion.

7. A contact index assembly according to claim 1 wherein said electrical contact is formed on one arm of said forked end portion, the other arm thereof being stepped away from said roller, said engaging means including a third pin having a longer length than said first and second pins, said first and second pins being spaced from the stepped arm and clearing the latter toward the end of the oscillatory excursion of said roller on the electrical contact stroke thereof, said third pin being engageable against the outer edge of the stepped arm to limit the oscillatory excursion of said roller.

8. A contact index assembly according to claim 7 wherein said pins project from a face of said roller, said third pin being angularly spaced behind said first and second pins on the electrical contact stroke of said roller and being mounted on a longer radius than said first and second pins.

9. A contact index assembly according to claim 8 wherein said first and second pins successively engage said one arm, said first pin lying on a shorter radius than said second pin and being angularly spaced forwardly of said second pin on the contact stroke of said roller.

10. A contact index assembly according to claim 5 wherein said electrical contact is formed on one arm of said forked end portion, the other arm thereof being stepped away from said roller, said engaging means including a third pin having a longer length than said first and second pins, said first and second pins being spaced from the stepped arm and clearing the latter toward the end of the oscillatory excursion of said roller on the contact stroke thereof, said third pin being angularly spaced behind said first and second pins on the electrical contact stroke of said roller and extending beyond said first and second pins, said third pin being engageable against the outer edge of the stepped arm to limit the oscillatory excursion of said roller.

11. A contact index assembly according to claim 1 wherein said pallet swings through a angular position intermediate said lateral angular positions, a first magnet carried by said assembly and disposed adjacent said intermediate position, a second magnet carried by said pallet in position to lie in substantially spaced registry with the first mentioned magnet when said pallet swings through said intermediate position, said magnets having adjacent poles of like polarity for producing a repelling force to drive said pallet toward said laterally spaced angular positions.

12. A contact index assembly according to claim 1 wherein said index assembly comprises a pair of index wheels having peripheral teeth, the teeth on said wheels being in meshing engagement with each other, said pallet end portion having means extending betwen said wheels and alternately engaging the teeth on each wheel in response to rocking movement of said pallet to rotate said wheels in opposite directions one from the other.

13. A contact index assembly according to claim 1 wherein said index assembly comprises a wheel having peripheral teeth, a pawl pivotally mounted outwardly of said teeth and having end portions on opposite sides of the pivoted axis thereof, said end portion comprising magnetic poles providing an attracting force tending to pivot said pawl in opposite directions, one of said end portions engaging said teeth, the opposite end portion of said pawl being spaced from said teeth as said one end portion clicks past said pawl whereby said one end portion is maintained in engagement against said teeth due to the greater magnetic attraction between said one end portion and said teeth than said opposite end portion and said teeth.

14. An index mechanism for advancing the gear train of a watch comprising: a pallet mounted for rocking movement from a first angular position to a second laterally spaced angular position through an intermediate position, a balance staff mounted for oscillating movement, means on said balance staff for engaging an end portion of said pallet to initiate a pallet stroke and pivot said pallet from said first position through said intermediate position as said balance staff moves in one direction, an index assembly adapted to advance at watch gear train, said pallet being adapted to drive said index assembly during rocking movement of said pallet to advance the gear train, a magnet carried by said mechanism and disposed adjacent said intermediate position, and a second magnet carried by said pallet in position to lie in substantially spaced registry with the first mentioned magnet when said pallet swings through said intermediate position, said magnets having adjacent poles of like polarity for producing a repelling force to drive said pallet toward said second position to complete the pallet stroke.

15. An index mechanism according to claim 14 wherein said intermediate angular position is substantially coincident with a straight line intersecting the pivotal axis of said balance staff and said pallet, and means for arresting the pivotal motion of said pallet at said second position.

16. An index mechanism according to claim 15 wherein said index assembly comprises a pair of wheels in meshing engagement one with the other, said pallet including means extending between said wheels and alternately engaging the teeth on each wheel in response to rocking movement of said member to thereby rotate said wheels in opposite directions.

17. An index mechanism according to claim 14 wherein said index assembly comprises a pair of index wheels having peripheral teeth, the teeth on said wheels being in meshing engagement with each other, said pallet having a member extending between said wheels and alternately engaging the teeth on each wheel in response to rocking movement of said member to rotate said wheels in opposite directions one from the other.

18. An index mechanism for driving the gear train of a watch comprising a member mounted for rocking movement, means for imparting rocking movement to said member, a pair of index wheels having peripheral teeth and adapted to drive the gear train of a watch, the teeth on said wheels being in meshing engagement with each other, means on said member extending between said wheels and alternately engaging the teeth on each wheel in response to rocking movement of said member to rotate said wheels in opposite directione one from the other, and said engaging means includes means for arresting movement of said member in the opposite directions after predetermined rotation of said wheels.

19. An index mechanism according to claim 18 wherein said engaging means comprises a pin projecting from said member, said pin engaging successive teeth on each wheel on alternate strokes of said member.

20. An index mechanism according to claim 18 wherein said engaging means includes a first surface for engaging a tooth on one of said wheels during movement of said member in one direction to rotate said one wheel and a second surface initially spaced from the succeeding tooth on said one wheel when said first surface engages said tooth, said first and second surfaces being cammed between the engaged tooth and said succeeding tooth in response to further rotation of said member and wheel to arrest movement of said member in said one direction.

21. An index mechanism according to claim 20 wherein the axis of rotation of said wheels and said member are substantially parallel to one another, the rotation of said one wheel being in a direction opposite to the rotation of said member.

22. An index mechanism according to claim 21 wherein said second surface extends outwardly from the axis of rotation of said member no further than the arc of a circle circumscribed by the outer end of a radius extending from such axis to the point of engagement between said succeeding tooth and said second surface.

23. An index mechanism according to claim 18 wherein the axis of rotation of said wheels and said member are substantially parallel to one another, said engaging means including a first surface for successively engaging succeeding teeth on one of said wheels during movement of said member in one direction to rotate one wheel, a second surface for successively engaging succeeding teeth on the other of said wheels during movement of said member in the other direction to rotate said other wheel, a third surface engageable against the next succeeding tooth on an engaged wheel in response to rotation of said engaged wheel, said first and third surfaces and said second and third surfaces being alternately cammed between the engaged and succeeding teeth on the respective wheels to arrest movement of said member in opposite directions.

24. An index mechanism for driving the gear train of a watch comprising a balance wheel mounted for oscillating movement, two index wheels having peripheral teeth in meshing engagement and adapted to drive the gear train of a watch, an elongated lever pivoted intermediate its ends between said index wheels and said balance wheel and including an indexing end for alternate engagement with the teeth of said index wheels, and means on said balance wheel engaging the other end of said lever to alternate said indexing end between said index wheels.

25. The combination of claim 24 wherein the oscillation axis of the balance wheel and pivotal axis of the lever lie on a center line perpendicular to a line which passes through the rotational axes of the index wheels, the longitudinal axis of said lever being substantially coincident with the center line when the other end of the lever is free of the engaging means in the balance wheel.

26. The combination of claim 24 wherein the oscillation axis of the balance wheel and pivotal axis of the lever lie on a center line perpendicular to a line which passes through the rotational axes of the index wheels, and means biasing the lever so that the index end thereof engages the teeth of one index wheel, the means on the balance wheel engaging the other end of the lever acting against the bias to urge the indexing end of the lever past the center line and into engagement with the teeth of the other index wheel and when the engaging means on the balance wheel is free of the other end of the lever, the biasing means again urges the index end of the lever into engagement with the teeth of said one index wheel to complete a one tooth advance of the index wheels.

27. An index mechanism for advancing the gear train of a watch and retaining the same in the advanced position comprising a member mounted for rocking movement about a first aixs means for imparting rocking movement to said member, an index assembly adapted to advance a watch gear train, said member being adapted to drive said index assembly during rocking movement of said member to advance the gear train, said index assembly including a wheel having peripheral teeth, a pawl pivotally mounted outwardly of said teeth and about a second axis, and magnetic means urging said pawl into engagement with said teeth.

28. An index mechanism for advancing the gear train of a watch and retaining the same in the advanced position comprising a member mounted for rocking movement, means for imparting rocking movement to said member, an index assembly adapted to advance a watch gear train, said member being adapted to drive said index assembly during rocking movement of said member to advance the gear train, said index assembly including a wheel having peripheral teeth, a pawl pivotally mounted outwardly of said teeth, and magnetic means urging said pawl into engagement with said teeth, said index assembly comprising a pair of index wheels having peripheral teeth, the teeth on said wheels being in meshing engagement with each other, and means on said member extending between said wheels and alternately engaging the teeth on each wheel in response to rocking movement of said member to rotate said wheels in opposite directions one from the other, said first mentioned wheel being connected to said pair of wheels to retain said wheels in advanced position.

29. An index mechanism for advancing the gear train of a watch and retaining the same in the advanced position comprising a member mounted for rocking movement, means for imparting rocking movement to said member, an index assembly adapted to advance a watch gear train, said member being adapted to drive said index assembly during rocking movement of said member to advance the gear train, said index assembly including a wheel having peripheral teeth, a pawl pivotally mounted outwardly of said teeth, and magnetic means urging one end of said pawl into engagement with said teeth, said member being mounted for rocking movement from a first angular position to a second laterally spaced angular position through an intermediate angular position, a magnet carried by said mechanism and disposed adjacent said intermediate position, and a second magnet carried by said pallet in position to lie in substantially spaced registry with the first mentioned magnet when said member swings through said intermediate position, said magnets having adjacent poles of like polarity for producing a repelling force to alternately drive said member toward said first and second angular positions.

30. An index mechanism according to claim 27 wherein said pawl has end portions on opposite sides of the pivotal axis thereof, said pawl comprising a permanent magnet with said end portions having opposite polarity.

31. An index mechanism according to claim 27 wherein said wheel is formed of magnetic material, said pawl having end portions on opposite sides of the pivotal axis thereof, said end portions comprising magnetic poles producing an attracting force tending to pivot said pawl in opposite directions, one of said end portions engaging said teeth, the opposite end portion of said pawl being spaced from said teeth as said one end portion clicks past said pawl whereby said one end portion is maintained in engagement against said teeth due to the greater magnetic attraction between said one end portion and said teeth than said opposite end portion and said teeth, and said opposite end portion being spaced from said teeth an initial distance at least as great as the peripheral distance transcribed by said one end of said pawl as said one end pivots outwardly from said wheel.

32. An index mechanism according to claim 27, wherein said rocking means comprises a pallet carried by said mechanism for pivotal movement, and means carried by said pallet for driving said wheel unidirectionally in response to rocking movement of said pallet, the pivotal axes of said pawl and said pallet extending in spaced substantially parallel relation one to the other.

References Cited
UNITED STATES PATENTS 3,183,426  5/1965  Haydon.

FOREIGN PATENTS 1,283,246  5/1962  France.
1,255,852  1/1961  France.

STEPHEN J. TOMSKY, Primary Examiner

E. C. SIMMONS, Assistant Examiner

U.S. Cl. X.R.

58—116

PO-1050
(5/69)

UNITED STATES PATENT OFFICE
CERTIFICATE OF CORRECTION

Patent No. 3,505,805　　　　　　　　Dated April 14, 1970

Inventor(s) NATHAN COHEN et al

It is certified that error appears in the above-identified patent and that said Letters Patent are hereby corrected as shown below:

Column 3, line 45, "amagnetically" should read -- a magnetically --. Column 4, line 70, "as" should read -- at --. Column 5, line 21, "42" should read -- 41 --. Column 6, line 25, "describde" should read -- describe --. Column 7, line 35, "wheen" should real -- wheel --;
Column 10, line 36, "a" should read -- an -- ; lines 55 and 56 should read -- wherein said index assembly comprises a wheel having peripheral teeth, a pawl pivotally mounted outwardly of -- .
Column 12, line 1, after "rotate" insert -- said --; line 45, "aixs" should read -- axis, --

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents